United States Patent
Burpo et al.

(10) Patent No.: US 7,138,028 B2
(45) Date of Patent: Nov. 21, 2006

(54) VACUUM ASSISTED RESIN TRANSFER METHOD FOR CO-BONDING COMPOSITE LAMINATE STRUCTURES

(75) Inventors: Steven J. Burpo, St. Charles, MO (US); Terry A. Sewell, Ballwin, MO (US); John C. Waldrop, III, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 183 days.

(21) Appl. No.: 10/851,512

(22) Filed: May 21, 2004

(65) Prior Publication Data
US 2004/0256053 A1    Dec. 23, 2004

Related U.S. Application Data

(63) Continuation-in-part of application No. 09/915,886, filed on Jul. 26, 2001, now abandoned.

(51) Int. Cl.
*B32B 37/00* (2006.01)
*B29C 45/16* (2006.01)
*B64C 1/00* (2006.01)

(52) U.S. Cl. .................. 156/245; 156/285; 264/257; 264/259; 264/263; 244/177 R; 244/126

(58) Field of Classification Search .................. None
See application file for complete search history.

(56) References Cited

U.S. PATENT DOCUMENTS 4,470,862 A * 9/1984 More et al. ............... 156/245
4,560,428 A   12/1985 Sherrick et al.
4,622,091 A   11/1986 Letterman
4,695,344 A    9/1987 Crane et al.
4,786,343 A   11/1988 Hertzberg
4,902,215 A    2/1990 Seemann, III
4,942,013 A    7/1990 Palmer et al.
4,966,802 A   10/1990 Hertzberg
4,988,469 A    1/1991 Reavely et al.

(Continued)

FOREIGN PATENT DOCUMENTS

GB    2 225 277    5/1990

OTHER PUBLICATIONS

U.S. Appl. No. 10/655,257, filed Sep. 4, 2003, Alberts et al.

*Primary Examiner*—Justin R. Fischer
(74) *Attorney, Agent, or Firm*—Harness Dickey & Pierce P.L.C.

(57) ABSTRACT

A method for forming complexly shaped composite laminate assemblies. A pair of dry fiber preforms are placed on a tool with a thin film adhesive layer therebetween. A vacuum bag encloses the preforms and the adhesive layer. The preforms are heated to a temperature sufficient to cause the adhesive to become viscous and to wet several plys of each of the preforms. The preforms are then allowed to cool slightly before resin is infused via a vacuum source through each of the preforms to thoroughly wet each of the preforms. The resulting joint formed at the bond line of the two preforms is stronger than what would be formed simply by adhering two otherwise completely formed preforms together because the dry fiber preforms, in connection with the heating of the preforms, allow wetting of several plys of each of the preforms at the joint area, rather than just the surface ply of each preform.

33 Claims, 3 Drawing Sheets

U.S. PATENT DOCUMENTS

| | | |
|---|---|---|
| 5,061,542 A | 10/1991 | Brace |
| 5,080,851 A | 1/1992 | Flonc et al. |
| 5,300,360 A | 4/1994 | Kocsis et al. |
| 5,403,537 A | 4/1995 | Seal et al. |
| 5,567,499 A | 10/1996 | Cundiff et al. |
| 5,840,238 A | 11/1998 | Setiabudi et al. |
| 5,851,336 A | 12/1998 | Cundiff et al. |
| 5,939,013 A | 8/1999 | Han et al. |
| 5,981,023 A | 11/1999 | Tozuka et al. |
| 6,555,045 B1 | 4/2003 | McClure et al. |
| 2002/0022422 A1 | 2/2002 | Waldrop, III et al. |
| 2003/0019567 A1 | 1/2003 | Burpo et al. |
| 2003/0090025 A1 | 5/2003 | Nelson et al. |

* cited by examiner

VACUUM ASSISTED RESIN TRANSFER METHOD FOR CO-BONDING COMPOSITE LAMINATE STRUCTURES

CROSS-REFERENCE TO RELATED APPLICATION

This application is a continuation-in-part of U.S. patent application Ser. No. 09/915,886 filed on Jul. 26, 2001 now abandoned. The disclosure of which is incorporated herein by reference in its entirety as if fully set forth herein.

FIELD OF THE INVENTION

The present invention relates to a method for securing composite laminate structures, and more particularly to a method for bonding two or more composite laminate structures to produce an even stronger joint between the joined surfaces of the structures.

BACKGROUND OF THE INVENTION

Vacuum assisted molding methods are well known in the art for forming resin-fiber composite structures. Traditionally, however, the formation of such structures has been limited to panels and other like-shaped structures. Complexly shaped structures, such as a portion of a skin and an associated stiffener, have heretofore been difficult, if not impossible, to produce from traditional composite molding systems and methods in a single molding step because such complex structures are difficult to "lay up". By "lay up", it is meant arranging a plurality of fiber plies (i.e., layers) into a single fiber preform. As such, the manufacture of various complexly shaped structures has typically involved forming two independent composite laminate structures through the well known vacuum molding process, and then securing the structures together via rivets or other like mechanical fasteners in a separate manufacturing step.

Various attempts have been made to bond two or more completely formed composite laminate structures together via a suitable adhesive. U.S. Pat. No. 4,786,343, assigned to The Boeing Company, discloses various methods for bonding two or more composite laminate structures together via an adhesive. While these methods have proven effective in bonding a wide variety of complexly shaped composite laminate structures, it would nevertheless be desirable to provide a system and method in which the bonding of two or more complexly shaped composite structures can be accomplished on a suitable tool, in a single manufacturing operation, using an otherwise conventional vacuum assisted resin transfer molding process. More specifically, it would be highly desirable to provide a system and method in which dry fiber preforms (i.e., multi-layer preforms that have not yet been preimpregnated with resin) can be placed on a suitable tool with the preforms precisely aligned in the desired orientation relative to one another, with an adhesive material placed at the desired bond line(s), and the bonding of the preforms together accomplished immediately prior to infusing the preforms with resin, and all with a single manufacturing operation. This would eliminate the added labor associated with subsequently taking the finished composite laminate component pieces and precisely aligning same, in a separate manufacturing step, prior to adhering the independent component pieces together. It is further expected that a system and method which accomplishes heating and flowing of the adhesive into the surfaces of two or more independent, dry fiber preforms, will produce even greater migration of the viscous adhesive into the plys of each of the preforms.

SUMMARY OF THE INVENTION

The present invention relates to systems and methods for forming complexly shaped structures from two or more independent dry fiber preforms in a single manufacturing operation. In a preferred implementation, the method involves the steps of taking the dry fiber preforms and assembling the preforms with adhesive material between those surfaces of the preforms that are to be bonded together. This is preferably accomplished with the preforms resting on a tool of a conventional vacuum assisted resin transfer molding apparatus. The preforms are precisely aligned relative to one another, and one or more alignment tools are used to maintain the preforms in the desired alignment. An airtight structure, for example, a vacuum bag, is then placed over the entire structure. The vacuum bag has at least one opening in communication with a reservoir filled with resin, and at least one opening in communication with a vacuum generating source.

In preferred embodiments, the adhesive comprises a thin film layer of adhesive which is placed between each of the surfaces of the two preforms being bonded together. The entire assembly is heated to a temperature sufficient to cause the adhesive to become viscous and to migrate (i.e., flow) into the plys of each of the preforms. A vacuum force is generated at this time which further assists in causing the viscous adhesive to migrate and thoroughly "wet" several plys of each of the preforms at those areas where the adhesive has been placed. When it is determined that satisfactory wetting of the dry fiber preforms with the adhesive has occurred, resin from the resin reservoir is admitted into the airtight enclosure and drawn through each of the preforms to thoroughly wet each of the preforms. The resin substantially fills the microscopic pockets and interstices around each fiber in those plys which the adhesive has wet. This strengthens the bondline at those areas that are being joined by the adhesive.

The entire assembly is then allowed to cure before being removed from the tool. Once removed, the two preforms form a rigid, single piece composite laminate structure. Advantageously, the bonding of the independent dry fiber preforms and the subsequent infusion of resin into each of the preforms can be accomplished in a single manufacturing operation. The joint produced at the bondline(s) of the preforms is enhanced due to the increased migration of the viscous adhesive into the plys of each of the preforms at those areas where bonding has taken place.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
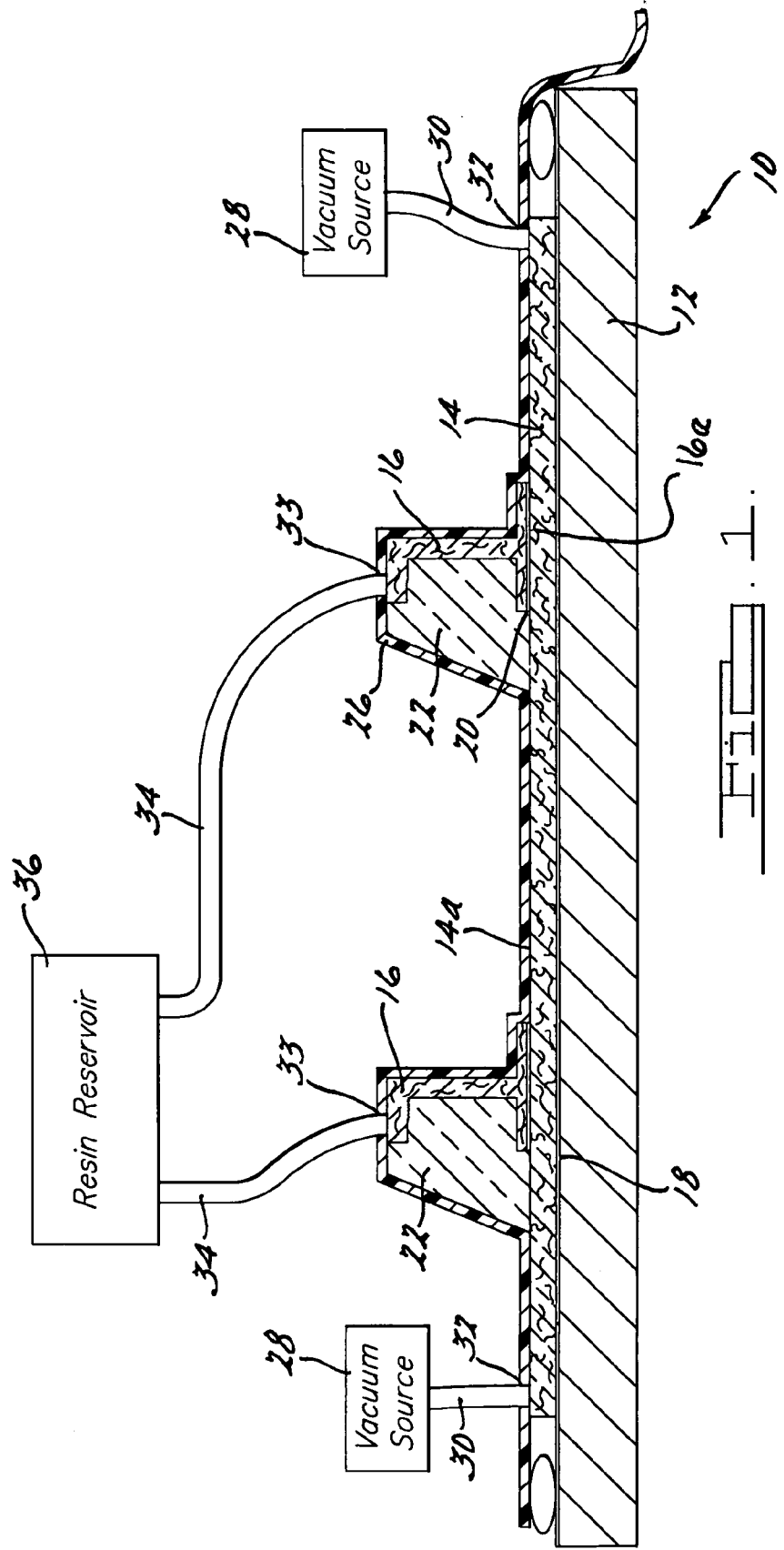
FIG. 1 is a simplified view of a portion of a tool for performing a preferred method of the present invention and showing two independent dry fiber preforms with an adhesive between surfaces of the preforms that are to be bonded together.

Referring to FIG. 1, there is shown a portion of a tool 10 used for implementing a preferred method of vacuum assisted resin transfer co-bonding in accordance with the present invention. The tool 10 can be a conventional tool used for performing vacuum assisted resin transfer molding. As shown, the tool 10 generally comprises a relatively large (e.g., typically one inch (25.4 mm) thick) aluminum plate 12 upon which the manufacturing operation takes place. A first dry fiber preform 14 and a second dry fiber preform 16 are placed relative to one another in the desired orientation and with a layer of adhesive 20 disposed between surfaces (e.g., 14a and 16a) of the dry fiber preforms 14 and 16 that are to be bonded together. The adhesive layer 20 is placed between the dry fiber preforms 14 and 16 before they are infused with resin, for example by a VARTM (vacuum assisted resin transfer molding) process.

It is strongly preferred that dry fiber preforms be used as this will maximize, or at least increase, strength at the joint between the two preforms 14 and 16 when the manufacturing operation is completed. Each of the dry fiber preforms 14 and 16 comprise preformed fiber layups, typically comprised of fiberglass or carbon cloth. In this particular example, the dry fiber preform 14 will eventually comprise a section of skin (e.g., a mold line skin) of an aircraft fuselage while dry fiber preform 16 comprises a stiffener. The stiffener can include any of a wide range of stiffening elements such as a hat-shaped stiffening element, J-shaped stiffening element, I-beam, C-shaped stiffening element, etc. Indeed, it is understood that the systems and methods of the present invention are not limited to the bonding of any two particular shapes of preforms, but can be adapted for use with a wide variety of differently shaped preforms to form complexly shaped assemblies such as C-shaped composite laminate assemblies, Z-shaped assemblies, and so forth.

A dry fiber preform (e.g., 14 and 16) is typically formed from a plurality of plys or layers of fibrous material without any adhesive between adjacent layers within that dry fiber preform. Such a dry fiber preform is also typically formed with adjacent layers being disposed so that the fibers extend perpendicularly to each other. Thus, it can be said that the fibers are directed along the X and Y axes of the surface of the material but that no fibers extend in the Z direction. Thus, when opposing surfaces (e.g. a surface 14a of dry fiber preform 14 and a surface 16a of dry fiber preform 16) are bonded together with adhesive, the adhesive essentially forms the only means by which the two opposing surfaces are held together. Thus, the greater the migration of adhesive into each of the plys of the surfaces being bonded together, the greater the joint strength becomes.

With further reference to FIG. 1, the dry fiber preform 14 which is intended to rest on the plate 12 of tool 10 is initially placed on a thin release sheet 18. This sheet is a thin layer, typically 1–2 mills (0.0254 mm–0.0508 mm) thick, fluoroelastomer material or Teflon® which allows the preform 14 to be easily removed from the surface of the plate 12 of tool 10 after the operation is completed. A thin film adhesive layer 20, typically between about 15–20 mills (0.381 mm–0.508 mm) in thickness, is placed on an upper surface 14a of the preform 14 and then sandwiched in-between those surfaces 14a and 16a which are to be bonded together. In various implementations, the adhesive layer 20 is essentially a cloth impregnated with adhesive and commercially available from a number of sources.

In preferred implementations as shown in the figures, the adhesive layer 20 is preferably placed only between those opposing surfaces 14a and 16a that are to be bonded together. The inventors have recognized that this can be especially beneficial for producing relatively lightweight composite parts (e.g., composite skin panels, etc.) intended for aerospace applications in which weight can be an important consideration. Alternative implementations, however, can include adhesives placed at other strategic locations (e.g., joints and interfaces between two separate preforms) where additional or further strength may be needed, including between the plies of a given preform.

Regarding the adhesive layer 20, a wide range of adhesives can be used, although high modulus adhesives are generally preferred. In various implementations, the adhesive layer 20 can also be a self-supporting film of adhesive. Exemplary adhesives that can be used in various implementations of the present invention are described in U.S. Pat. No. 4,786,343 to Hertzberg, the entire disclosure of which is incorporated herein by reference.

With further reference to FIG. 1, an alignment member 22 is used to hold each dry fiber preform 16 in a precise orientation relative to the preform 14 during the manufacturing operation. The alignment member 22 typically comprises a washable mandrel comprised of a solid block of foam or silicone which can be easily removed from contact with the preforms 14 and 16 after the manufacturing operation is completed. The alignment tool 22 and the preforms 14 and 16 with the adhesive layer 20 therebetween are enclosed within an airtight structure, such as a vacuum bag 26. The vacuum bag 26 is coupled to one or more vacuum sources 28 via one or more sections of conduits or tubing 30 in communication with one or more openings 32 in the vacuum bag 26. While two vacuum sources 28 and two sections of tubing 30 are illustrated in FIG. 1, it will be appreciated that the methods of the present invention can be performed with a single vacuum source and a single vacuum tube, but that the construction of the composite laminate structure being formed may dictate that two or more such vacuum sources may be required.

The vacuum bag 26 also includes at least one opening, and in the drawing of FIG. 1 a pair of openings 33, which are in communication with a corresponding pair of lengths of conduit or tubing 34 leading to a resin reservoir 36. Tubing lengths 34 allow resin to be drawn in by the vacuum created by vacuum sources 28 from the resin reservoir 36 into the interior area defined by the vacuum bag 26. Again, however, depending upon the overall shape of the composite laminate structure being formed, a single resin supply line 34 and a single point of entry 33 in the vacuum bag 26 may be sufficient to adequately supply the needed amount of resin to perform the molding process.

Figure 2:
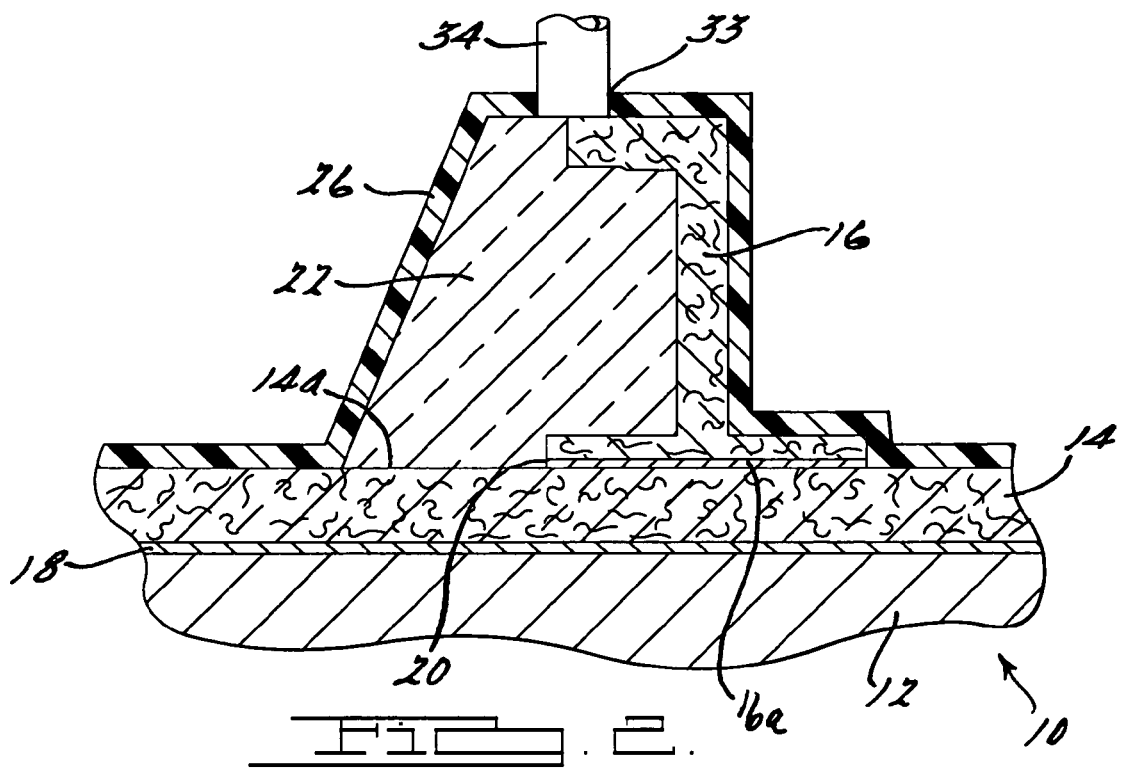
FIG. 2 is an enlarged view of an area of the two dry fiber preforms of FIG. 1 illustrating the adhesive prior to having migrated into the plys of each of the preforms and prior to resin being infused into each of the preforms.

Referring to FIG. 2, once the dry fiber preforms 14 and 16, the adhesive layer 20 and the alignment member 22 are enclosed within the vacuum bag 26, the entire assembly is heated to a temperature preferably between about 150° F. (66° C.) and 300° F. (149° C.), and more preferably to about 250° F. (121° C.) for a time period in the range of between about 15 minutes to 60 minutes. But these temperatures and time durations are exemplary only, and the specific temperature and time duration required will depend in large part on the specific type of resin being used, as well as the specific configuration of the part being formed.

The heating phase causes the adhesive layer 20 to become viscous and to migrate (i.e., flow) into several plys of each of the preforms 14 and 16. By heating the preforms 14 and 16 along with the adhesive 20, this also has the beneficial effect of removing any residual moisture that may be contained in the preforms 14 and 16 which might otherwise impede the flow of the adhesive 20 into the plys of the preforms 14 and 16. The use of dry fiber preforms rather than prepregs is important because the adhesive is able to flow more easily into several plys of each preform 14 and 16. Thus, wetting of more than just the surface ply of each preform 14 and 16 occurs. This is in contrast to methods which involve heating already completely resin cured preforms with an adhesive layer placed between surfaces to be joined, which typically only allow the outermost ply of each preform to be wetted with the adhesive. With methods of the present invention, the viscous adhesive flows and substantially fills the interstices and microscopic voids around the individual fibers of the first several plys of each preform 14 and 16.

Further, by using dry fiber preforms rather than prepregs, various implementations of the invention can also allow for reduction in manufacturing costs by eliminating the need for and costs associated with forming prepregs (e.g., preimpregnating fiber with resin and using an autoclave to process and form the prepregs). Indeed, various implementations of the invention enable bonding independent dry fiber preforms to one another with adhesive and subsequent infusion of resin into each preform to be accomplished in a single manufacturing operation.

During the above-described initial phase of heating the preforms 14 and 16 and the adhesive layer 20, a vacuum may be generated by the vacuum sources 28 to further assist in drawing the viscous adhesive 20 into the plys of each of the preforms 14 and 16. However, the use of dry fiber preforms and the heating of the preforms together with the adhesive layer 20 is sufficient to cause wetting of several plys of the preforms 14 and 16 at the eventual bond areas.

After the adhesive 20 has fully wetted at least some plys of each of the dry fiber preforms 14 and 16, the preforms are allowed to cool down to a temperature between about room temperature, i.e., about 70° F. (21° C.) and 200° F. (93° C.), and more preferably about 150° F. (65° C.). Once the preforms 14 and 16 have cooled to this temperature, the vacuum sources 28 are turned on, if they haven't already been operating during the prior heating phase, and suitable valves (not shown) in the resin supply conduits 34 allow resin to flow from the resin reservoir 36 through the openings 33 in the vacuum bag 26 and into each of the preforms 14 and 16. The resin thoroughly wets all of the plys of each of the preforms 14 and 16 and further flows into the small interstices and voids around the fibers in those plys which have previously been wetted by the adhesive 20. By this time, the adhesive 20 can be partially cured (referred to in the art typically as "B-staged"), and only a small degree of little additional flow of the adhesive 20 will occur until the viscosity becomes too high for flow to continue. Thus, the adhesive 20 will not be pulled away from the bond line at the surfaces of the preforms 14 and 16 being joined. By flowing into the interstices, pockets and voids (which the adhesive 20 has not occupied) around those fibers previously wetted by the adhesive 20, the resin "backfills" these areas to further enhance the strength of the joint formed between the preforms 14 and 16.

The complete wetting of each of the preforms 14 and 16 with resin can be visually detected by an operator if the vacuum bag 26 comprises a translucent vacuum bag. If not, thorough wetting can be assumed as soon as the resin begins to be drawn out of the preforms 14 and 16 and into each of the tubing sections 30 (FIG. 1). At this point, the vacuum sources 28 are turned off and the flow of resin in each of the resin supply lines 34 is interrupted through the use of one or more conventional valves. It will be appreciated that some adjustment of the vacuum lines 30 and resin supply lines 34 can be performed to help in removing any air from the preforms 14 and 16.

Figure 3:
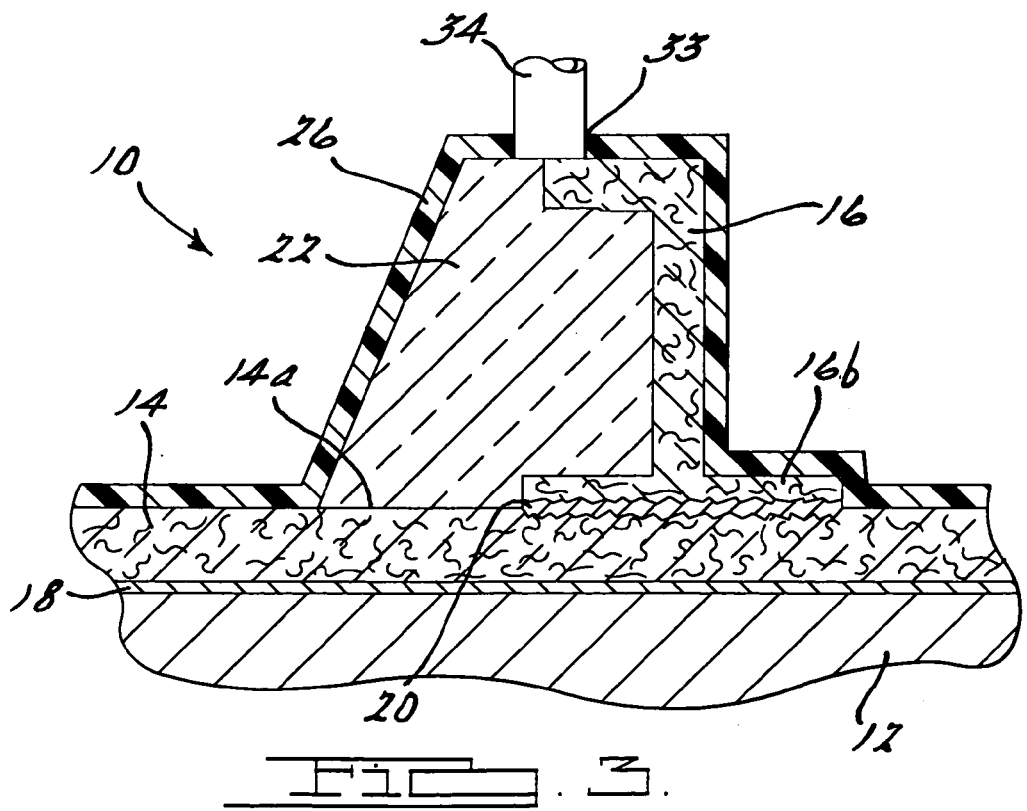
FIG. 3 is a view of the assembly shown in FIG. 2 but after the adhesive has flowed into the plys of each of the preforms, and also after the resin has thoroughly wetted each of the preforms.

Referring to FIG. 3, at this point it can be seen that the thin film adhesive layer 20 has essentially disappeared, having essentially flowed into several plys of the preform 14 and several plys of portion 16b of the preform 16. The temperature of the preforms 14 and 16 is then raised to preferably between about 200° F. (93° C.) and 400° F. (204° C.) depending on the resin system, and more preferably about 350° (176° C.). Again, however, it will be appreciated that these temperatures will depend on the resin being used.

The preforms 14 and 16 are then held at this temperature for preferably between about four hours to eight hours, depending on the resin system, and more preferably for about six hours, again depending on the resin being used. This fully cures the adhesive 20 and the resin in each of the preforms 14 and 16 to form a single composite laminate structure.

In various implementations, the joint(s) at the surfaces of the preforms 14 and 16 which have been bonded together have exhibited a significant improvement in "pull away" strength of about 25%–30% over those composite laminate structures where adhesive has been used to bond otherwise completely or partially cured preforms into a single structure. In strength testing, a joint constructed in accordance with a preferred method of the present invention showed an improvement in the maximum average shear load that could be applied before separation of the joined components began to occur from 186 lb./in. to 264 lb./in.

Once the preforms 14 and 16 have been fully cured, the vacuum bag 26 is removed, the alignment members 22 are separated from the preforms 14 and 16, and the preform 14 is removed from the release layer 18.

Figure 4:
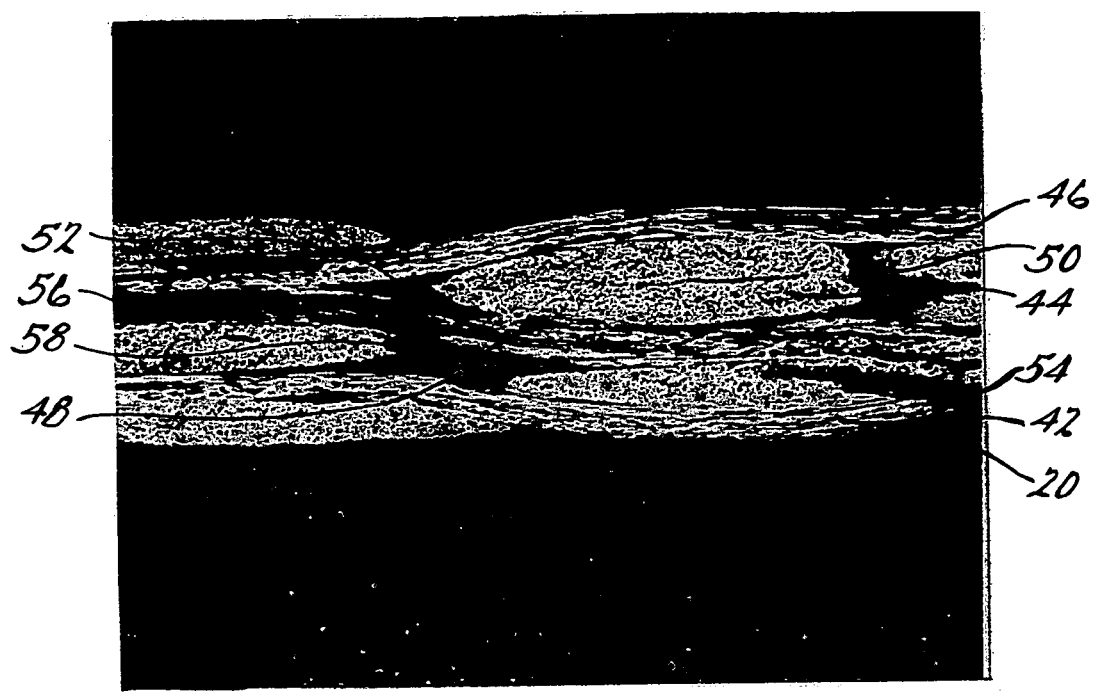
FIG. 4 is a photomicrograph of a bondline between a pair of dry fiber preforms after adhesive has flowed into several plys of each preform.
Figure 5:
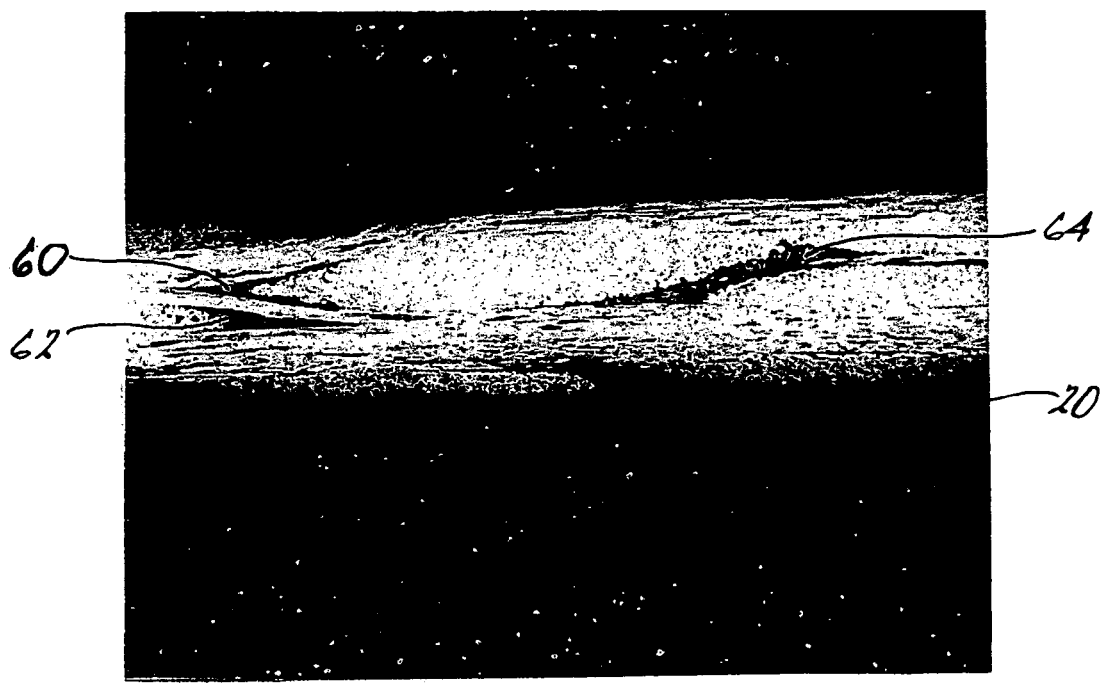
FIG. 5 is a photomicrograph of a pair of fiber preforms after adhesive has flowed into several plys of each preform and after resin has been infused into each preform to thoroughly wet fibers of each preform.

With brief reference to FIGS. 4 and 5, the photomicrograph of FIG. 4 represents a magnification of 25× of a typical fiber preform (e.g., either preform 14 or 16) after the preform has been wetted with the adhesive 20 before resin has been infused into the preform. As shown, the adhesive layer 20 extends generally along the length of the preform while areas 42, 44 and 46 represent fibers forming separate plys of the preform. It can also be seen that portions of adhesive 20 have flowed into areas 48, 50 and 52 in-between the fibers 42, 44 and 46. Areas 54, 56 and 58 represents areas which are void of both adhesive 20 and resin.

Turning to FIG. 5, a section of a fiber preform (e.g., either 14 or 16) is shown after the resin and adhesive 20 have fully wet the preform. The adhesive 20 can be seen to occupy areas 60, 62 and 64. The resin (which is the color white in the photomicrographs of FIGS. 4 and 5) has essentially saturated and back filled those voids, pockets and interstices which were not previously filled by the adhesive 20. This thorough wetting of those areas with the resin that were not previously wetted with the adhesive 20 serves to form an even stronger joint when the preforms are fully cured.

Various implementations of the present invention can provide significant manufacturing advantages over previously developed methods which rely on using fully cured preforms to begin the adhesive bonding process. In preferred implementations, the dry fiber preforms 14 and 16 and the adhesive layer 20 can be set up in one step within the vacuum bag 26 and then formed in a single manufacturing operation. This saves significant labor and time over those methods which require the preforms to be partially or fully cured with resin before being bonded together. Various implementations of the present invention may also provide for better locational control of features, less final trim cleanup work and better part definition. Various implementations of the present invention can also require fewer tools during the infusion step.

By using dry fiber preforms, the preforms themselves do not need to be stored in a carefully temperature controlled environment, as would typically be the case with B-staged preforms. The use of dry fiber preforms rather than B-staged preforms also means that limitations on the time during which the preforms can be stored is not a consideration, as would be the case with B-staged preforms. B-staged preforms must typically be used within a relatively short time period (typically one month or less) from the time that the B-staging has occurred. Various implementations of the present invention further involve less handling and human contact with the resin by workers because of the use of dry fiber preforms rather than B-staged or fully wetted preforms.

The methods and systems of the present invention may be used with, or may include, apparatuses and/or teachings described in U.S. Pat. No. 4,786,343 to Hertzberg; U.S. Pat. No. 4,902,215 to Seemann III; U.S. Pat. No. 4,942,013 to Palmer et al; U.S. Pat. No. 5,939,013 to Han; and U.S. application Ser. No. 09/731,945 (U.S. Publication number 20020022422), filed Dec. 7, 2000, all of which are hereby incorporated by reference.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for forming a composite skin panel from first and second independent dry fiber preforms, each said independent dry fiber preform including a plurality of layers of fiber material without any adhesive between adjacent layers within each respective dry fiber preform, the method comprising:
    disposing an adhesive only at one or more interfaces of the dry fiber preforms before the dry fiber preforms are infused with resin;
    placing the dry fiber preforms with the adhesive therebetween within an airtight enclosure;
    heating the adhesive to a temperature sufficient to cause the adhesive to become viscous;
    applying a vacuum to the airtight enclosure to cause the viscous adhesive to flow into and at least substantially saturate a subplurality of layers of each said dry fiber preform;
    after the subplurality of layers are substantially saturated with the viscous adhesive, then infusing a resin into the dry fiber preforms and using the vacuum to draw the resin through the dry fiber preforms to substantially saturate the preforms with resin; and
    curing the adhesive and the resin within the preforms to form a composite skin panel in which one of said preforms comprises a skin and the other of said preforms comprises a stiffener bonded to the skin.

2. The method of claim 1, wherein the adhesive at least partially bonds the preforms to one another before the preforms are infused with resin.

3. The method of claim 1, wherein the method includes assembling the dry fiber preforms with adhesive therebetween on a tool of a vacuum assisted resin transfer molding apparatus.

4. The method of claim 3, wherein the placing, heating, applying, infusing, and curing are each performed while the preforms are on the tool.

5. The method of claim 3, wherein the assembling, placing, heating, applying, infusing, and curing are all performed in a single manufacturing operation.

6. The method of claim 1, wherein the method includes enhancing bonding of the preforms to one another by causing increased migration of viscous adhesive into the subplurality of layers of the dry fiber preforms.

7. The method of claim 6, wherein the method includes further enhancing bonding of the preforms to one another by causing the resin to substantially backfill interstices and voids in areas of the subplurality of layers where the adhesive has not saturated.

8. The method of claim 1, wherein the adhesive disposed only at the one or more interfaces is a self-supporting film of adhesive.

9. A method for forming first and second dry fiber preforms into a composite laminate structure, each said dry fiber preform including a plurality of layers of fiber material, the method comprising:
    placing an adhesive against only a surface of the first dry fiber preform which is to be bonded to a surface of the second dry fiber preform;
    placing the second dry fiber preform against the adhesive such that the adhesive is only between the surfaces of the dry fiber preforms to be bonded to one another;
    placing the first and second dry fiber preforms with the adhesive therebetween within an airtight enclosure;
    heating the adhesive to a temperature sufficient to cause the adhesive to become viscous;
    causing the viscous adhesive to flow into and at least substantially saturate a subplurality of layers of each said dry fiber preform; and
    after the subplurality of layers of the dry fiber preforms are substantially saturated with the viscous adhesive, then infusing a resin into the dry fiber preforms to thoroughly wet the dry fiber preforms.

10. The method of claim 9, further comprising curing the adhesive and the resin in the preforms whereupon curing the preforms are bonded to one another to form the composite laminate structure.

11. The method of claim 10, wherein the curing comprises heating the preforms to a temperature between about 200 degrees Fahrenheit and 400 degrees Fahrenheit for a predetermined period of time.

12. The method of claim 9, wherein:
    the airtight enclosure comprises a vacuum bag; and
    the causing includes applying a vacuum to the vacuum bag to cause the viscous adhesive to flow into the subplurality of layers of each said dry fiber preform.

13. The method of claim 9, wherein the heating includes heating the dry fiber preforms to a temperature of between about 150 degrees Fahrenheit and 300 degrees Fahrenheit.

14. The method of claim 13, wherein the method includes, after the subplurality of layers of the dry fiber preforms are substantially saturated with the viscous adhesive, allowing the dry fiber preforms to cool to a temperature of between about 70 degrees Fahrenheit and 200 degrees Fahrenheit before beginning to infuse the resin into the dry fiber preforms.

15. The method of claim 9, wherein the adhesive at least partially bonds the first dry fiber preform to the second dry fiber preform before beginning to infuse the resin into the dry fiber preforms.

16. The method of claim 9, wherein the heating, causing, and infusing are all performed while the preforms are on a tool of a vacuum assisted resin transfer molding apparatus.

17. The method of claim 9, wherein the adhesive placed against the surface of the first dry fiber preform is a self-supporting film of adhesive.

18. The method of claim 9, wherein the method includes enhancing bonding of the preforms to one another by causing increased migration of viscous adhesive into the subplurality of layers of the dry fiber preforms.

19. The method of claim 18, wherein the method includes enhancing bonding of the preforms to one another by causing the resin to substantially backfill interstices and voids in areas of the subplurality of layers where the adhesive has not saturated.

20. A method for forming a composite laminate structure from first and second dry fiber preforms, each said dry fiber preform including a plurality of layers of fiber material, the method comprising:
   placing a layer of thin film adhesive against only a surface of the first dry fiber preform which is to be bonded to a surface of the second dry fiber preform;
   placing a second dry fiber preform against the layer of thin film adhesive such that the layer of thin film adhesive is only between the surfaces of the dry fiber preforms to be bonded to one another, thereby forming a composite laminate assembly without any adhesive between adjacent layers within each respective dry fiber preform;
   placing the composite laminate assembly within a vacuum bag;
   heating the composite laminate assembly to a predetermined temperature sufficient to cause the layer of thin film adhesive to become viscous causing the adhesive to flow into a subplurality of layers of each said dry fiber preform, to thereby at least substantially saturate the subplurality of layers;
   after the subplurality of layers are substantially saturated with the viscous adhesive, then infusing a resin into the dry fiber preforms and applying a vacuum to the vacuum bag to draw the resin through the dry fiber preforms to thoroughly wet the dry fiber preforms; and
   curing the composite laminate assembly to form the composite laminate structure.

21. The method of claim 20, wherein the composite laminate assembly is heated to a temperature between about 150 degrees Fahrenheit and 300 degrees Fahrenheit to cause the layer of thin film adhesive to become viscous.

22. The method of claim 20, wherein the composite laminate assembly is heated to a temperature of approximately 250 degrees Fahrenheit to cause the layer of thin film adhesive to become viscous.

23. The method of claim 20, wherein the composite laminate assembly is allowed to cool to a temperature below the predetermined temperature that caused the layer of thin film adhesive to become viscous after the viscous adhesive has at least substantially saturated the subplurality of layers of the dry fiber preforms and before infusing the resin into the dry fiber preforms.

24. The method of claim 20, wherein:
   the composite laminate assembly is heated to a temperature of between about 150 degrees Fahrenheit and 300 degrees Fahrenheit to cause the layer of thin film adhesive to become viscous; and
   the dry fiber preforms are allowed to cool to a temperature of between about 70 degrees Fahrenheit and 200 degrees Fahrenheit after the viscous adhesive has at least partially saturated the subplurality of layers of the dry fiber preforms and before infusing the resin into the dry fiber preforms.

25. The method of claim 20, wherein the curing is accomplished by heating the composite laminate assembly to a temperature of between about 200 degrees Fahrenheit and 400 degrees Fahrenheit.

26. The method of claim 20, wherein the curing is accomplished by heating the composite laminate assembly to a temperature of approximately 350 degrees Fahrenheit for a predetermined length of time.

27. The method of claim 26, wherein the predetermined length of time comprises a duration of between about fours hours and eight hours.

28. A method for forming at least a pair of independent dry fiber preforms into a composite laminate structure, each said dry fiber preform including a plurality of layers of fiber material, the method comprising: disposing a thin film adhesive layer only between surfaces of the dry fiber preforms which are to be bonded to one another, thereby forming a composite laminate assembly without any adhesive between adjacent layers within each respective dry fiber preform;
   placing the composite laminate assembly within a vacuum enclosure;
   heating the composite laminate assembly sufficient to cause the thin film adhesive layer to become viscous;
   applying a vacuum to the vacuum enclosure to cause the viscous adhesive to flow into a subplurality of the plurality of layers of each said dry fiber preform to substantially saturate the subplurality of layers;
   waiting a period of time for the dry fiber preforms to cool down to a second temperature;
   once the dry fiber preforms reach the second temperature, using the vacuum to draw resin from a resin reservoir in communication with the vacuum enclosure through the dry fiber preforms to thoroughly wet the dry fiber preforms; and
   after the preforms have been thoroughly wetted by the resin, further heating the composite laminate assembly to a third temperature greater than the first temperature to cure the adhesive and the resin in the preforms, whereupon curing the preforms are bonded to one another to form the composite laminate structure.

29. The method of claim 28, wherein the first temperature comprises a temperature within the range of about 150 degrees Fahrenheit to 300 degrees Fahrenheit.

30. The method of claim 28, wherein the second temperature comprises a temperature within the range of about 70 degrees Fahrenheit to 200 degrees Fahrenheit.

31. The method of claim 28, wherein the third temperature comprises a temperature within the range of about 200 degrees Fahrenheit to 400 degrees Fahrenheit.

32. The method of claim 28, wherein the method includes allowing the adhesive to at least partially cure before heating the composite laminate assembly to the third temperature.

33. The method of claim 28, wherein heating the composite laminate assembly to the third temperature fully cures the adhesive and the resin.

* * * * *